…

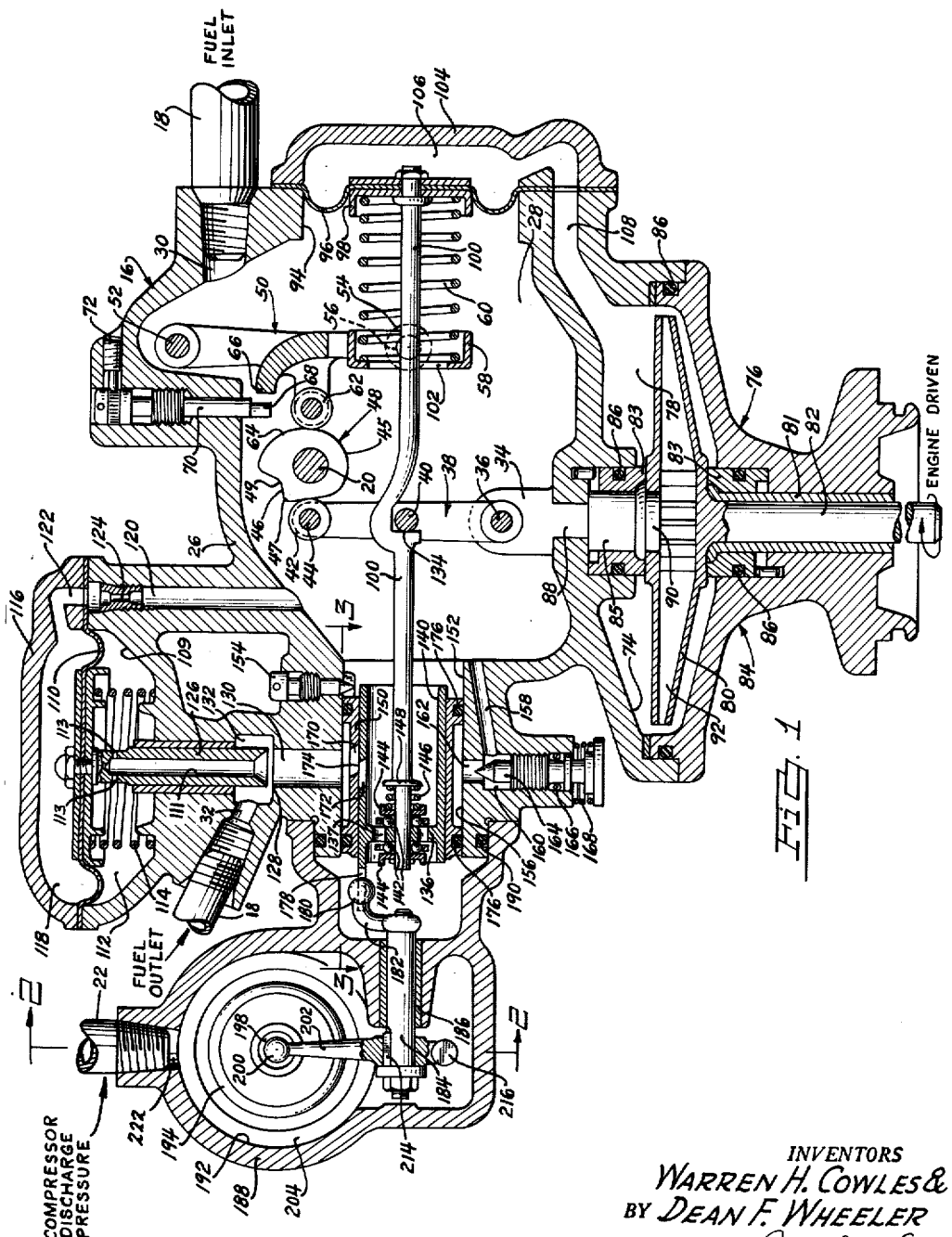

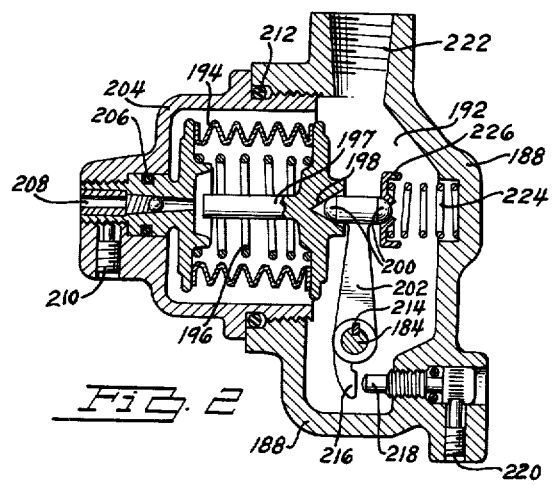
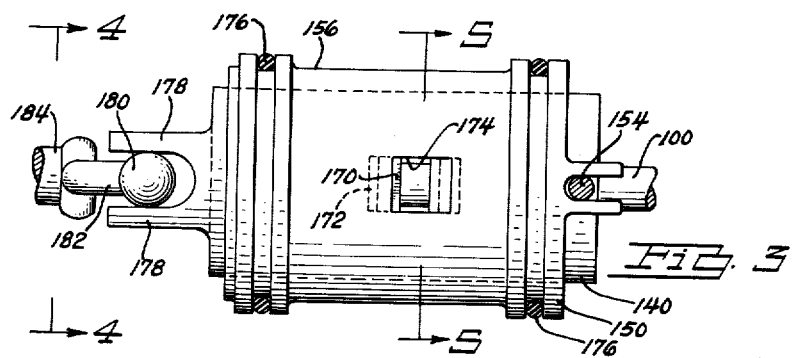
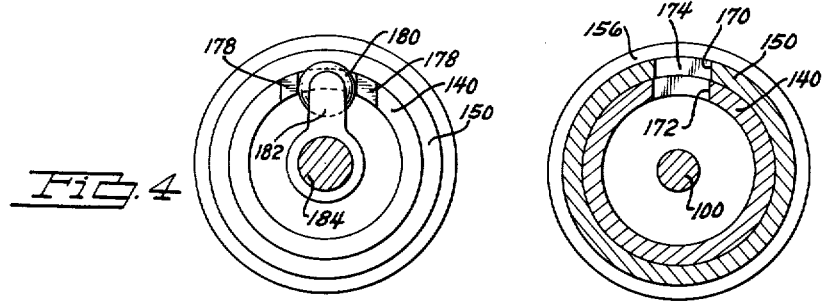
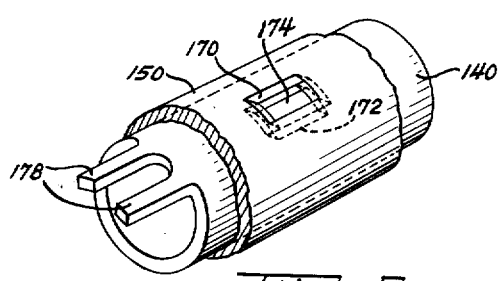
INVENTORS
WARREN H. COWLES &
BY DEAN F. WHEELER
Walter Patroha, Jr.
ATTORNEY

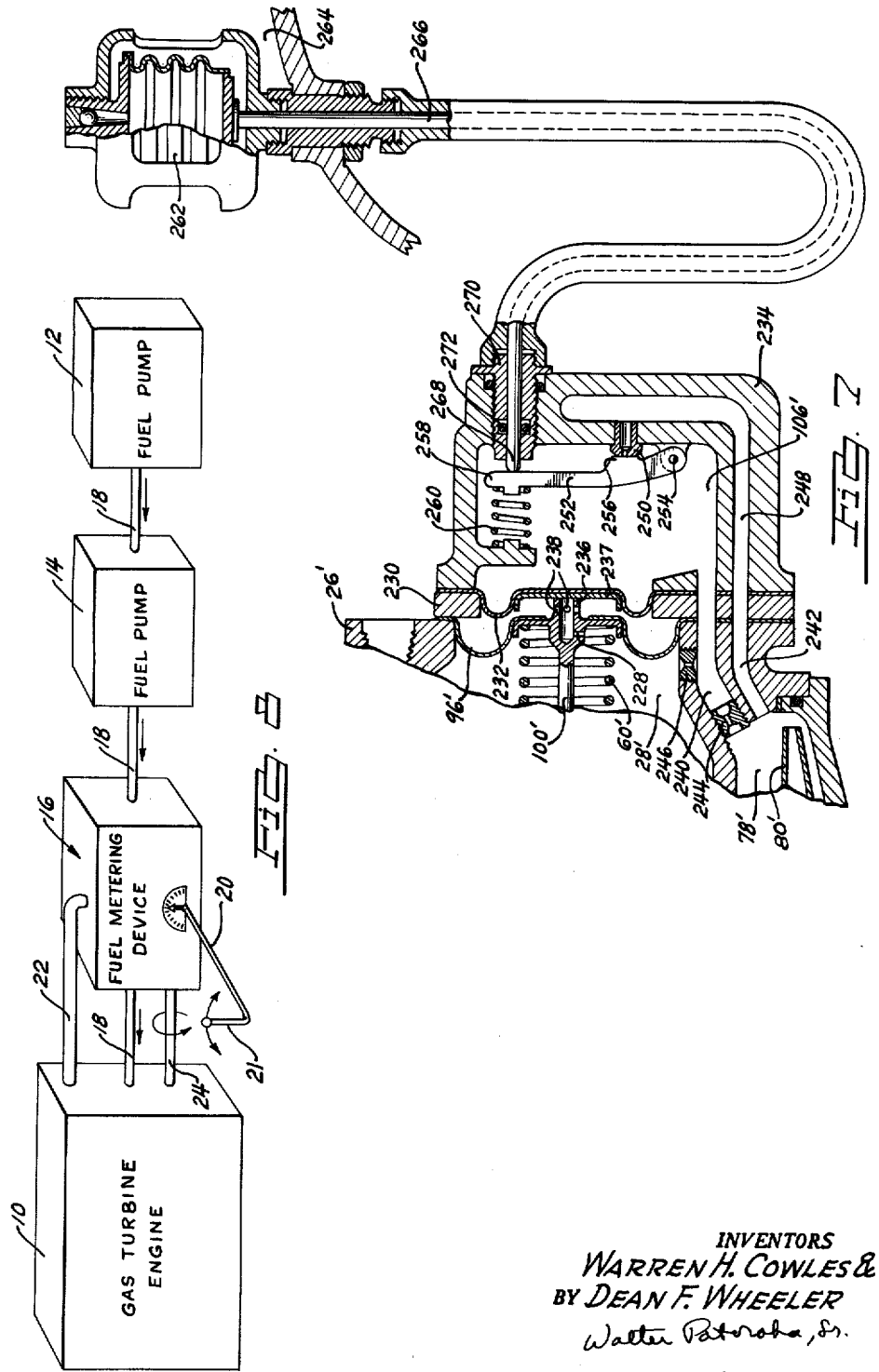

United States Patent Office 3,006,143
Patented Oct. 31, 1961

3,006,143
GAS TURBINE FUEL CONTROL
Warren H. Cowles and Dean F. Wheeler, Detroit, Mich., assignors to Holley Carburetor Company, Van Dyke, Mich., a corporation of Michigan
Filed June 18, 1956, Ser. No. 592,187
3 Claims. (Cl. 60—39.28)

This invention relates generally to gas turbine fuel control for internal combustion engines, and more particularly to fuel metering devices for gas turbine engines.

An object of the invention is to provide a fuel metering device which will automatically schedule fuel to the engine according to any selected engine power output setting.

Another object of the invention is to provide a fuel metering device in which a novel valve structure meters the proper fuel for acceleration and deceleration, and in amounts so that turbine temperature limits are not exceeded.

Another object of the invention is to provide a device of this kind adapted to maintain correct steady state engine speed for any condition of operation between idle and maximum power.

Still another object of the invention is to provide a fuel metering device in which the position of the valve controlling the amount of fuel metered for acceleration and deceleration is determined by the position of the engine power output control lever and compressor discharge pressure, with engine speed being sensed to establish a steady state position of the valve.

A further object of the invention is to provide a fuel metering device of the above type having an adjustable fuel by-pass so that the engine is supplied with the minimum fuel required to maintain combustion in the event that the valve controlling acceleration and deceleration fuel is fully closed.

These and other objects of the invention will become apparent by reference to the following specifications and attached drawings, wherein:

FIG. 1 is an elevational cross-sectional view of a fuel metering device embodying the invention;

FIG. 2 is a cross-sectional view taken on the plane of line 2—2 of FIG. 1, looking in the direction of the arrows;

FIG. 3 is an enlarged fragmentary plan view taken on the plane of line 3—3 of FIG. 1, looking in the direction of the arrows;

FIG. 4 is an end elevational view taken on the plane of line 4—4 of FIG. 3, looking in the direction of the arrows;

FIG. 5 is a cross-sectional view taken on the plane of line 5—5 of FIG. 4, looking in the direction of the arrows;

FIG. 6 is a fragmentary perspective view of a portion of the structure shown by FIG. 3;

FIG. 7 is a fragmentary cross-sectional view illustrating a modified construction that may be substituted for that shown by the righthand portion of FIG. 1.

FIG. 8 is a block diagram illustrating the relation between a fuel metering device embodying the invention and a typical fuel system of a gas turbine engine.

Referring to the drawings in greater detail, FIG. 8 illustrates diagrammatically a gas turbine engine 10 and its associated fuel system including a fuel tank 12, a fuel pump or pressure regulator 14, and a fuel metering device 16 shown in detail by FIGS. 1–6, all of which are connected to each other and to the engine 10 by means of the fuel conduits 18. The fuel metering device 16, which is the subject of this invention, includes a rotatable power control shaft 20, the position of which is set by the lever 21 to determine the power out-put of the engine 10.

Conduit 22 admits engine compressor discharge pressure to the metering device 16, and the rotating shaft 24 introduces engine speed to the metering device 16.

The diagram of FIG. 8 is intended only to illustrate the relationship of the fuel metering device 16 to a typical fuel system of a gas turbine engine. Thus, the details of construction of the engine 10, the regulator 14 and the tank 12 are not important to the invention.

Referring now to FIG. 1, a fuel metering device 16 embodying the invention comprises a housing 26 formed to provide a fuel chamber 28 having an inlet 30 to receive fuel from any suitable fuel pressure regulator or pump 14 and an outlet 32 through which metered fuel is discharged to the engine 10 by way of conduit 18.

The housing 26 is internally formed to provide a projection 34 having a pivot 36 for the acceleration lever 38. The lever 38 has a laterally extending pin 40 suitably positioned intermediate the ends thereof and a roller 42 mounted on a pin 44 or any other suitable bearing member adapted to engage the suitably contoured surface 46 of the cam 48 which is secured to the engine power setting shaft 20 for rotation therewith.

A governor lever 50, also disposed within the fuel chamber 28, is pivoted to the housing 26 on the pin 52. The opposite end of the governor lever 50 may be forked and provided with bearings 54 for receiving oppositely disposed trunnion projections 56 of a member adapted to engage or retain one end of the governor spring 60. The governor lever 50 may also be provided intermediate the ends thereof with a roller or other bearing member 62 adapted to engage the surface 64 of the cam 48 and a projection having a shoulder 66 adapted to engage the eccentric end 68 of the pin 70. The pin 70 is threaded for rotational adjustment of the end 68, and it is retained in any given position by means of the set screw 72.

The housing 26 may be formed to provide an external annular recess 74 which, together with the cover and bearing member 76 formed at the free end thereof for mounting the device 16 on an engine, provides a chamber 78 adapted to receive the slinger valve or other centrifugal pump 80 which is rotated in the bearings 81 and 83, at a speed proportional or equal to engine speed, by the drive shaft 82 connected to the engine 10. The assembly of the slinger valve 80 and cover and bearing member 84 is mounted to the housing 26 through well known O-ring seals 86 and any suitable fastening means not shown. The chamber 78 communicates with the fuel chamber 28 through the passage 88 in the housing, the passage 85 in the bearing 83 and the center passage 90 and the radial passages 92 in the slinger valve 80.

The passage 94 in the housing 26 is closed by means of a flexible diaphragm 96 having attached thereto a member 98 adapted to receive the opposite end of the governor spring 60 and having secured to the center thereof an axially extending rod 100 which passes axially through the spring 60 and the opening 102 in the spring retaining member 58. The diaphragm 96 is secured to the housing by means of a cover 104 which may be bolted to the housing 26 and which is formed to provide a chamber 106 of which the flexible diaphragm 96 forms one wall and which communicates with the chamber 78 through the passage 108.

It will be noted, therefore, that fuel in the fuel chamber 28 will be forced into the chamber 106 at some pressure dependent upon engine speed and that the pressure of this fuel acting on diaphragm 96 opposes the force of the governor spring 60 on the diaphragm 96.

The housing 26 is further formed to provide a second external recess 109 closed by a flexible diaphragm 110 to form a chamber 112 containing a compression spring 114 adapted to force the diaphragm 110 outwardly. The diaphragm 110 is secured to the housing 26 by a cover 116 formed to provide an oppositely disposed chamber 118 of which the diaphragm 110 forms a wall and which communicates with the fuel chamber 28 through the passages 120 and 122 and the fixed restriction 124. It is thus apparent that fuel in the fuel chamber 28 may enter the chamber 118 to provide a force opposing the combined force of the spring 114 and the metered fuel pressure in chamber 112 acting on diaphragm 110. The metered fuel enters chamber 112 through passages 111 and 113. The diaphragm 110 has secured thereto an axially extending throttling valve 126 which is thus movable with respect to the valve seat 128 formed by the junction of the passage 130 and the annular recess 132, both of which communicate with the fuel outlet 32, to control the pressure drop of the fuel flowing through valve 140. The more the pressure in chamber 118 exceeds that in chamber 112, the more valve 126 throttles the flow of metered fuel. Valve 126, however, never completely cuts off the flow of fuel, its function being to maintain a constant pressure drop across orifice 174.

The rod 100 is formed intermediate the ends thereof to provide a shoulder 134 adapted to engage the pin 40 on the acceleration lever 38. The opposite end of the rod 100 is connected to the transverse internal web 136 of the hollow cylindrical valve 140. The web 136 has vent openings 137 to prevent the build-up of pressures interfering with free axial movement of the valve 140. Frictionless bearings 142 retained between the web 136 and the spaced retainer members 144 permit free rotation of the cylindrical valve 140 about the rod 100 and insure axial movement of the cylindrical valve 140 with the rod 100. The compression spring 146 between one of the retainer members 144 and the shoulder 148 on the rod 100 provides a connection between the rod 100 and the valve 140 which is free of axial play.

The cylindrical valve 140 is adapted for free close fitting rotational and axial movement within the sleeve member 150 which is secured against movement within the passage 152 in the housing 26 by means of the set screw 154. The sleeve 150 has an annular external recess 156 which together with the passages 158, 160, 162, 130 and the chamber 132, provides continuous communication between the fuel chamber 28 and the fuel outlet 32. A well known adjustable needle valve 164 sealed at 166 and spring loaded at 168 controls the continuous flow of fuel through the passage 162. The sleeve 150 and the valve 140 have adjacent openings 170 and 172 respectively which, due to the possible two-directional (rotational and axial) relative movement of the valve 140 within the sleeve 150 provide a variable orifice 174 through which fuel may flow from the fuel chamber 28 to the fuel outlet 32. This structure is best shown by FIGS. 3–6, and it is apparent that if the variable orifice 174 should be completely closed a certain predetermined amount of fuel continues to flow from the fuel chamber 28 to the fuel outlet 32 through the by-pass provided by the annular recess 156 in the sleeve 150. The O-ring seals 176 prevent leakage of fuel from the fuel chamber 28 into the recess 156.

As best shown by FIGS. 3, 4 and 6, the cylindrical valve 140 is provided with elongated spaced lugs 178 adapted to receive, in all axial positions of the valve 140, the ball end 180 of a crank member 182, the latter being secured for rotation with the shaft 184 so that it is adapted to rotate the valve 140 about the rod 100.

Referring now to FIGS. 1 and 2, the shaft 184 is preferably fitted through the bearing 186 in the wall of a separate housing 188 adapted to be mounted on the housing 26 and sealed at 190. The housing 188 is formed to provide a chamber 192 having adjustably mounted therein a sealed evacuated bellows 194 containing a spring 196 adapted to expand the bellows and having at the free end thereof a conical recess 198 to receive in ball and socket joint fashion one of the transverse ball ended projections 200 at the end of the lever 202.

In the particular construction shown, the bellows 194 is screwed into a cap member 204 and sealed at 206. The axial position of the bellows 194 may thus be adjusted externally by inserting an Allen type wrench at 208 and subsequently tightening set screw 210. The cap and bellows assembly is then screwed into the housing 188 and sealed at 212.

The lever 202 is secured by means such as the key 214 to rotate the shaft 184 and is provided with a shoulder 216 at the opposite end thereof to engage the stop pin 218 which limits the counter-clockwise rotation (FIG. 2) of the lever 202 and the position of which is maintained by the set screw 220. The chamber 192 has an opening 222 through which engine compressor discharge pressure is admitted to compress the bellows 194 against the spring 196 to the extent that stop pin 197 will permit. The compression spring 224 between the housing 188 and the retainer 226 engaging the other projection 200 keeps the lever 202 in constant contact with the bellows 194.

FIGURE 7 illustrates a modified structure which may be substituted for the right-hand portion of the device 16 shown by FIGURE 1. While the modified structure may be employed, it is not essential.

In the modified structure, the rod 100' is provided at the hollow diaphragm end thereof with a balance passage 228 and passages 238 providing communication between chamber 28' and the opposite side of the diaphragm 96', which is cemented or otherwise secured to the radial flange extending from the rod 100' and providing an abutment for the spring 60'. The spacer member 230 and a second smaller diaphragm 232 is inserted between the diaphragm 96' and the new cover member 234. The free end 236 of the rod 100' is preferably secured in any convenient manner to the member 237 to which the diaphragm 232 may be cemented. In lieu of cementing, the diaphragms 96' and 232 may be secured in a similar manner as diaphragm 96 in FIG. 1, the important thing being that rod 100' and diaphragms 96' and 232 are connected together.

The housing 26' is formed to provide passages 240 and 242. Passage 240 contains fixed orifices or jets 244 and 246 of predetermined size, with jet 246 providing communication between the passage 240 and chamber 28'. The passage 240 leads to the chamber 106' behind the smaller diaphragm. The second unrestricted passage 242 connects with a passage 248 formed in the new cover member 234 and terminates in a valve seat 250.

A lever 252 pivoted at 254 to the inside of the cover member 234 is provided with a valve seat engaging member 256 and the opposite end 258 of the lever 252 is biased by a spring 260 to close the valve seat 250.

A sealed fluid-filled bellows 262 is disposed in the engine inlet passage 264, and a flexible rod 266 is secured to the free end of the bellows 262. The other end 268 of the flexible rod passes through the sealed bushing 270 and the seal 272 to pivot the lever 252 in a counter-clockwise direction against the force of spring 260 when the bellows 262 expands.

It is apparent that any other temperature sensitive device may be employed for the purpose of actuating the lever 252.

*Operation*

As already explained, minimum flow fuel is continuously supplied to the engine through the by-pass means 158, 160, 162, 156, 130 and 132, and the amount of minimum fuel flow may be adjusted by the needle valve 164. This fuel is just sufficient to maintain combustion in the engine, in the event that orifice 174 should close completely.

The amount of fuel supplied through the outlet 32 for any condition of engine operation except minimum fuel flow, is controlled by the position of valve 140, since it determines the size of the variable orifice 174. The valve 140 is in turn controlled by or responsive to three signals; (a) engine power output control lever position, (b) compressor discharge pressure, and (c) engine speed.

Thus, acceleration and deceleration fuel is metered as a function of the above variables.

In the specific embodiment of the metering device 16, as it is disclosed in FIG. 1, the power lever shaft 20 and cam 48 and the orifice 174 are in approximately half power position. Advancing the throttle for acceleration would require rotating the power lever shaft 20 and the cam 48 clockwise from the position shown. This would increase the preload on the spring 60, since the action of the cam surface 64 on the governor lever 50 would be to rotate the lever in a counter-clockwise direction about the pin 52. Increasing the load on the spring 60 would upset the previous steady state force balance between the spring 60 and the pressure differential across the diaphragm 96. The increased spring force would move the diaphragm 96 and the rod 100 to the right and open the metering orifice 174 in the axial direction by transmitting this axial movement to the valve 140. This movement to the right could continue only until shoulder 134 reaches the stop 40, the position of the stop 40 depending, of course, upon the contour of face 46 of the cam 48.

The speed of the engine would immediately increase, and the pressure of the fuel in chamber 106 would likewise increase. Finally, as engine speed approached that called for by setting of the power lever shaft 20, the forces on opposite sides of diaphragm 96 would be equalized, resulting in a new steady state condition free of the stop 40. This condition would be maintained until the power lever setting were changed. In other words, the openings 170 and 172, previously axially offset, would now approach a position of complete axial alignment.

The stop pin 40 connected to the acceleration lever 38 is provided to limit the axial travel to the right of the valve 140 in accordance with angle of the shaft 20. On acceleration from the half power position shown by FIG. 1, the latter occurs to a greater extent because the surface 46 of the cam 48 is such that it progressively permits the acceleration lever 38 to be further pivoted about pin 36 in a clockwise direction, which permits the stop 40 to be moved to the right. The high point 47 on the surface 46 provides proper settings for idle operation in this particular control; other engines may require a differently shaped cam. At any rate, it is apparent the position of the power lever shaft 20 is controlling in that the rod 100 will not travel farther in the axially opening position of the metering orifice 174 than the position of the stop pin 40 will allow.

The compressor discharge pressure signal rotates the valve 140 about the rod 100 to further vary the size of orifice 174. As the compressor discharge pressure, which is fed into the chamber 192 through inlet 222, increases the evacuated bellows 194 will be compressed. This causes crank 182 which is fastened to lever 202 through shaft 184 to rotate valve 140 clockwise when viewed as in FIG. 5. Thus, increasing compressor discharge pressure rotates the valve 140 so that openings 170 and 172 approach rotational alignment to enlarge the metering orifice 174; decreasing compressor discharge pressure, on the other hand, decreases the rotational opening of orifice 174. The adjustable stop 218 is provided to restrict the maximum travel of lever 202 in the opening direction of the metering orifice 174. The stop 218 which limits the rotation of shaft 184 in the opening direction of port 174 regardless of compressor discharge pressure may be used, for instance, to provide approximate torque limiting protection for the engine reduction gearing. Adjustment at 208 allows the bellows 194 to be screwed in or out, thus varying the position of the valve 140 for a given value of compressor discharge pressure.

Deceleration fuel is metered in the reverse manner, although still as a function of compressor discharge pressure, and the position of the power control lever shaft 20. Engine speed again provides the pressure in chamber 106 to effect a steady state condition.

Rotating the shaft 20 counter-clockwise for deceleration causes the cam 48 to rotate lever 38 in a counter-clockwise direction about pin 36, which causes stop pin 40 to push the rod 100 and valve 140 to the left against spring 60. However, the cam surface 64 is such that rotation of cam counter-clockwise decreases the load on spring 60 and permits spring 60 to keep roller 62 against the cam surface 64. Decreasing the load on spring 60 also closes metering orifice 174 axially due to the force unbalance across diaphragm 96, since the reduction of engine speed lags behind cam movement. In other words, the force represented by the pressure drop across the diaphragm 96 momentarily is greater than the reduced force of spring 60, and the valve 140 is moved to the left so that openings 170 and 172 approach a completely offset relation.

Reducing the fuel flow to the engine in this manner causes the engine speed and the compressor discharge pressure to drop and the rotational opening of orifice 174 is further (rotationally) reduced by the expansion of the bellows 194 against lever 202.

Drive shaft 82 is driven by the engine 10, and it drives slinger valve 80. The pressure of the fuel discharged radially through passages 92 is proportional to the square of engine speed. This fuel pressure is employed as a speed sense for the device 16. As the engine 10 approaches the speed called for by the particular position of the power control lever shaft 20, the fuel pressure out of the slinger valve 80 is fed through line 108 to chamber 106 behind diaphragm 96. When the pressure drop from chamber 106 to chamber 28 times the area of diaphragm 96 equals the force of spring 60, the axial movement of rod 100 and valve 140 will come to a steady state position. When the valve 140 comes to a steady state axial opening of orifice 174, the compressor discharge pressure will not change, and a constant metering area 174 will be held until further movement of the power control lever shaft 20.

Spring 146 loads rod 100 with respect to valve 140 insuring no axial motion with respect to each other; i.e., it serves as an anti-back lash spring.

The eccentric end 68 of pin 70 allows adjustment of the position of governor lever 50 with respect to cam 48 at the idle power control lever setting. The normal adjustment is such that shoulder 66 engages the stop 68 only at idle.

When the modified structure of FIG. 7 is employed, the operation of the device 16 is effected by engine inlet temperature.

As the speed sense slinger valve 80' turns it develops a pressure differential between chambers 28' and 78' which is proportional to the square of engine speed. This differential causes fuel to flow through orifices 244 and 246. It is apparent that the pressure differential across the governor diaphragm 232 or the orifice 246 also varies as the square of speed. Hence, with valve seat 250 closed, the pressure differential across diaphragm 232 is always a fixed percentage of the pressure differential between chambers 28' and 78'.

During low engine inlet temperature conditions, the valve seat 250 is completely closed. At a certain engine or control speed the pressure in chamber 106' is sufficient to move the governor diaphragm 232 against the pre-set governor spring 60', causing the control to govern.

At ambient inlet temperatures above a predetermined value, the temperature sensitive fluid inside of the bellows 262 expands. This expansion forces a flexible rod 266 through seal 272 moving the temperature lever 252 counter-clockwise. This opens the valve seat 250 a controlled amount, depending on the engine inlet temperature, and causes an increased percentage of the pressure differential due to the slinger valve 80' to be applied across the governor diaphragm 232. The effect is to reduce the speed at which the governor comes into operation and to thereby reduce the engine equilibrium speed.

The diaphragm 96' is employed as a safety diaphragm.

Normally, because of the small balancer passage 228, this diaphragm is not subjected to a pressure differential. If the governor diaphragm 232 ruptures, however, the safety diaphragm 96' will substantially contain the governor pressure differentials, since the passages 228 and 236 are relatively small, as compared to orifice 244. Since the area of this safety diaphragm 96' is significantly larger than the governor diaphragm 232, it will decrease the top speed of the engine an appreciable amount and warn the operator of control malfunction.

While a single modification of the invention has been shown and described, it is to be understood that it is shown only by way of example and that the invention is not limited thereto but includes everything coming within the scope of the following claims:

What we claim is:

1. A turbine engine fuel control having a power selecting lever comprising, a housing having an unmetered fuel inlet and a metered fuel outlet, a first chamber contained within said housing communicating with said unmetered fuel inlet, a first lever located within said chamber and pivotally mounted at one end to said housing by a first pivot member, a cam member pivotally mounted on a shaft and rotatably positioned in accordance with the position of said power selecting lever, a roller pivotally mounted to the other end of said first lever and being in continual contact with said cam member, a second lever located within said first chamber and pivotally mounted at one end to said housing by means of a second pivot member, a second roller pivotally secured to said second lever and at times in engagement with said cam member, a diaphragm forming a portion of the wall of said first chamber, a first sleeve member having at least one port formed therein secured within said first chamber, a second sleeve member slidably received within said first sleeve member so as to be freely adjustable angularly and axially therein, a second port formed within said second sleeve member and at times in registry with said port formed within said first sleeve member, a rod member slidably received within said second sleeve member and operatively connected to said diaphragm, first spring means located about said rod and arranged so as to continually urge the said second sleeve member in one direction with respect to said rod member, a first abutment formed at the other end of said second lever, a second spring positioned about said rod and located between said diaphragm and said first abutment urging said diaphragm and second sleeve member in a metered fuel increasing direction, a second abutment formed on said first lever intermediate the ends thereof, an abutment receiving portion formed on said rod member, receiving and engaging said second abutment, a second chamber formed between a first housing portion and said diaphragm, speed responsive impeller means for creating a fluid pressure in accordance with the rotational speed of said turbine engine, said diaphragm and impeller means operative to urge said second sleeve member in the metered fuel increasing direction, conduit means communicating between said impeller and said second chamber so as to communicate pressure variations created by said impeller to said diaphragm, bellows means responsive to compressor discharge pressure secured to said second sleeve member so as to rotate said sleeve member and said second port formed therein with respect to said first sleeve member and the port formed therein in accordance with compressor discharge pressure, an annular chamber formed between said first sleeve member and said first chamber receiving said first sleeve member, a first conduit portion downstream of said first sleeve member and in communication with said metered fuel outlet for receiving fuel metered by said ports formed in said first and second sleeve members, a throttling valve downstream of said first and second sleeve members controlling the pressure differential across said ports formed within said first and second sleeve members, a second conduit communicating between said annular chamber and said first chamber, and a threadably received needle valve cooperating with said second conduit for restricting the flow of fuel therethrough to a degree so as to allow a constant and continuous supply of fuel to said first conduit portion downstream of said first and second sleeve members regardless of the respective positions of the ports formed within said first and second sleeve members, and manually adjustable third abutment means positioned generally in the path of travel of said second lever so as to limit the movement of said second lever in the metered fuel decreasing direction by at times preventing said second roller from being in contact with said cam member as said cam member is rotated in the metered fuel decreasing direction.

2. A turbine engine fuel control having a power selecting lever comprising, a housing having an unmetered fuel inlet and a metered fuel outlet, a first chamber contained within said housing communicating with said unmetered fuel inlet, a first lever located within said chamber and pivotally mounted at one end to said housing by a first pivot member, a cam member pivotally mounted on a shaft and rotatably positioned in accordance with the position of said power selecting lever, a roller pivotally mounted to the other end of said first lever and in continual contact with said cam member, a second lever located within said first chamber and pivotally mounted at one end to said housing by means of a second pivot member, a second roller pivotally secured to said second lever and at times in engagement with said cam member, pressure responsive means forming a portion of the wall of said first chamber, a sleeve member having at least one port formed therein secured within said first chamber, a second sleeve member slidably received within said first sleeve member so as to be freely adjustable angularly and axially therein, a second port formed within said second sleeve member and at times in registry with said port formed within said first sleeve member, a rod member operatively connected to said second sleeve member and said pressure responsive means, a first abutment formed at the other end of said second lever, a spring positioned about said rod and located between said pressure responsive means and said first abutment urging said pressure responsive means and second sleeve member in a metered fuel increasing direction, a second abutment formed on said first mentioned lever intermediate the ends thereof, an abutment receiving portion formed on said rod member receiving and engaging said second abutment, a second chamber formed between a first housing portion and said pressure responsive means, speed responsive means for creating a fluid pressure in accordance with the rotational speed of said turbine engine, said pressure responsive means and impeller means operative to urge said second sleeve member in the metered fuel decreasing direction, conduit means communicating between said speed responsive means and said second chamber so as to communicate pressure variations created by said speed responsive means to said pressure responsive means, second pressure responsive means responsive to compressor discharge pressure secured to said second sleeve member so as to rotate said sleeve member and said second port formed therein with respect to said first sleeve member and the port formed therein in accordance with compressor discharge pressure, an annular chamber formed between said first sleeve member and said first chamber receiving said first sleeve member, a first conduit portion downstream of said first sleeve member and in communication with said metered fuel outlet for receiving fuel metered by said ports formed in said first and second sleeve members, a throttling valve downstream of said first and second sleeve members controlling the pressure differential across said ports formed within said first and second sleeve members, a second conduit communicating between said annular chamber and said first chamber, and a manually adjustable needle valve cooperating with said second conduit for restricting the flow of fuel therethrough to a degree so as to allow a constant and continuous minimum supply of fuel to said first conduit portion downstream of said first and second sleeve members regardless of the respective positions of the ports formed within said first and second sleeve members, and manually adjustable third abutment means positioned generally in the path of travel of said second lever so as to limit the movement of said second lever in the metered fuel decreasing direction by at times preventing said second roller from being in contact with said cam member as said member is rotated in the metered fuel decreasing direction.

3. A turbine engine fuel control having a power selecting lever comprising, a housing having an unmetered fuel inlet and a metered fuel outlet, a first chamber contained within said housing communicating with said unmetered fuel inlet, a first lever located within said chamber and pivotally mounted at one end to said housing by a first pivot member, a cam member pivotally mounted on a shaft and rotatably positioned in accordance with the position of said power selecting lever, a roller pivotally mounted to the other end of said first lever and in continual contact with said cam member, a second lever located within said first chamber and pivotally mounted at one end to said housing by means of a second pivot member, a second roller pivotally secured to said second lever and at times in engagement with said cam member, pressure responsive means forming a portion of the wall of said first chamber, a sleeve member having at least one port formed therein secured within said first chamber, a second sleeve member slidably received within said first sleeve member so as to be freely adjustable angularly and axially therein, a second port formed within said second sleeve member and at times in registry with said port formed within said first sleeve member, a rod member operatively connected to said second sleeve member and said pressure responsive means, a first abutment formed at the other end of said second lever, a spring positioned about said rod and located between said pressure responsive means and said first abutment urging said pressure responsive means and second sleeve member in a metered fuel increasing direction, a second abutment formed on said first mentioned lever intermediate the ends thereof, an abutment receiving portion formed on said rod member receiving and engaging said second abutment, a second chamber formed between a first housing portion and said pressure responsive means, speed responsive means creating a fluid pressure in accordance with the rotational speed of said turbine engine, said pressure responsive means and impeller means operative to urge said second sleeve member in the metered fuel decreasing direction, conduit means communicating between said speed responsive means and said second chamber so as to communicate pressure variations created by said speed responsive means to said pressure responsive means, second pressure responsive means responsive to compressor discharge pressure secured to said second sleeve member so as to rotate said sleeve member and said second port formed therein with respect to said first sleeve member and the port formed therein in accordance with compressor discharge pressure, an annular chamber formed between said first sleeve member and said first chamber receiving said first sleeve member, a first conduit portion downstream of said first sleeve member and in communication with said metered fuel outlet for receiving fuel metered by said ports formed in said first and second sleeve members, a throttling valve downstream of said first and second sleeve members controlling the pressure differential across said ports formed within said first and second sleeve members, a second conduit communicating between said annular chamber and said first chamber, and a manually adjustable needle valve cooperating with said second conduit for restricting the flow of fuel therethrough to a degree so as to allow a constant and continuous minimum supply of fuel to said first conduit portion downstream of said first and second sleeve members regardless of the respective positions of the ports formed within said first and second sleeve members.

References Cited in the file of this patent

UNITED STATES PATENTS

| | | |
|---|---|---|
| 2,422,808 | Stokes | June 24, 1947 |
| 2,604,756 | Greenland | July 29, 1952 |
| 2,622,393 | Edwards et al. | Dec. 23, 1952 |
| 2,688,841 | Decher et al. | Sept. 14, 1954 |
| 2,707,866 | Noon et al. | May 10, 1955 |
| 2,712,219 | Warner | July 5, 1955 |
| 2,714,803 | Abild | Aug. 9, 1955 |
| 2,720,751 | Kunz | Oct. 18, 1955 |
| 2,796,136 | Mock | June 18, 1957 |
| 2,823,738 | Gibney | Feb. 18, 1958 |
| 2,836,957 | Fox | June 3, 1958 |
| 2,856,754 | Torell | Oct. 21, 1958 |
| 2,880,580 | Wallace et al. | Apr. 7, 1959 |
| 2,906,093 | Robinson | Sept. 29, 1959 |
| 2,941,602 | Coar | June 21, 1960 |

FOREIGN PATENTS

| | | |
|---|---|---|
| 162,706 | Australia | May 4, 1955 |
| 614,202 | Great Britain | Dec. 10, 1948 |
| 694,083 | Great Britain | July 15, 1953 |